Sept. 12, 1967  N. M. RASKHODOFF  3,340,890
VIEWING PORT WITH REMOVABLE WINDOW
Filed Nov. 29, 1962  2 Sheets-Sheet 1
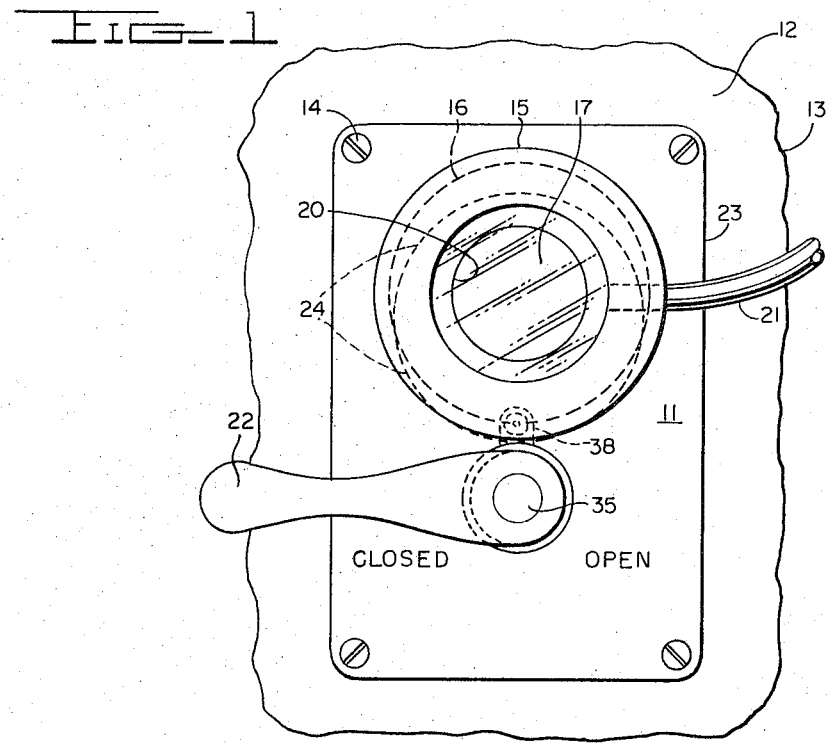
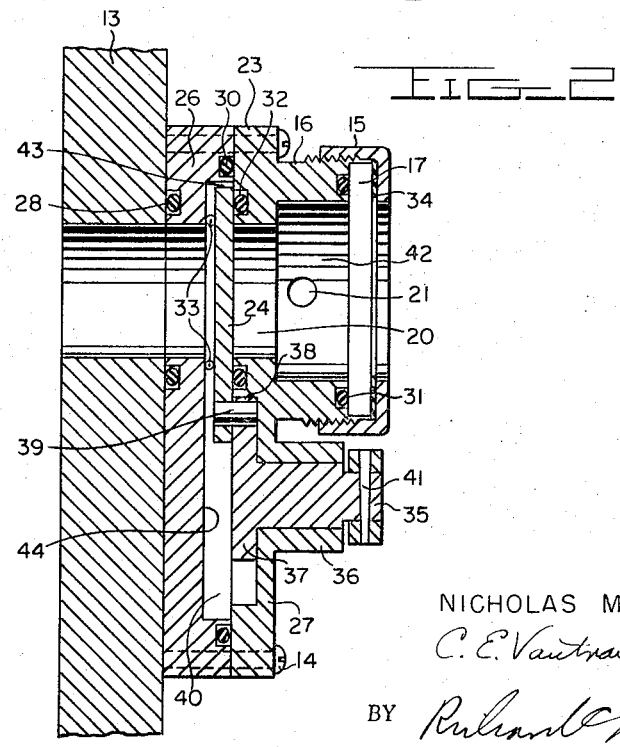
INVENTOR
NICHOLAS M. RASKHODOFF
ATTORNEY

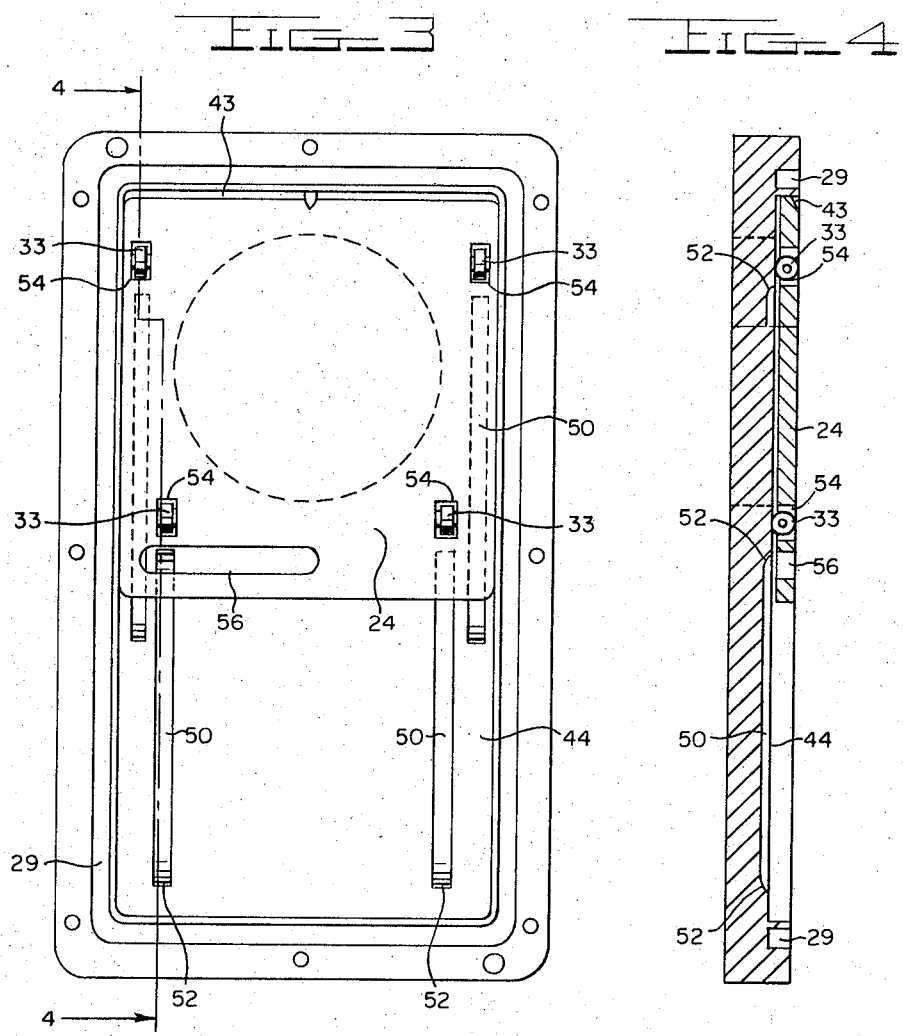

United States Patent Office 3,340,890
Patented Sept. 12, 1967

3,340,890
VIEWING PORT WITH REMOVABLE WINDOW
Nicholas M. Raskhodoff, Cheverly, Md., assignor to the United States of America as represented by the Secretary of the Navy
Filed Nov. 29, 1962, Ser. No. 241,081
1 Claim. (Cl. 137—315)

ABSTRACT OF THE DISCLOSURE

This disclosure is directed to a device for closing off a viewing port in a pressurized or evacuated chamber in order to preserve the condition when the window of the viewing port is removed for cleaning the window. The port is closed by a hand operated closure member which is moved into a sealing position and forced into place by cam action. Means is provided to pressurize or evacuate the area between the window and the closure means in order to provide the proper pressure conditions when removing and replacing the window.

The invention described herein may be manufactured and used by or for the Government of the United States of America for governmental purposes without the payment of any royalties thereon or therefor.

This application is a continuation-in-part of my copending application, Ser. No. 147,695, filed Oct. 25, 1961, and since abandoned, and relates in general to viewing windows or ports and more particularly to a viewing port having novel means for removal of the transparent member.

In many devices where it is desired and often necessary to have a viewing or sighting port through which the interior of a chamber may be viewed it is also necessary to interrupt activity within the chamber to clean or replace the transparent member of the viewing port. Such cleaning or replacement usually entails cessation of activities within the chamber and thereby results in a loss of time and material among other losses chargeable to interruption of operation. Whether the chamber is maintained at a vacuum or under pressure, there is additional loss in returning the chamber to its previous condition after a viewing port component has been cleaned or replaced. In some prior devices a cover has been used to be positioned over the sighting or viewing opening or shaft in place of the transparent member, however, such covers do not permit viewing while the transparent member is not in place and also such covers cannot be positioned without affecting conditions within the chamber. Other prior port closures may have a substitute port positioned to replace the existing viewing port with, however, the disadvantages of complexity, bulkiness, inadequate seal, etc., limiting the utility of such closures.

Accordingly, it is an object of this invention to provide a viewing port adaptable for use with either a vacuum chamber or a pressure chamber in which the transparent member is removable without affecting conditions within the chamber.

It is another object of the present invention to provide a viewing port having a removable transparent member in which a substitute closure member may be positioned without detachment of any port components.

It is a further object of the present invention to provide a viewing port which may incorporate a vacuum valve and a substitute closure member into a single structure which is simple yet positive in operation and occupies a minimum of space.

It is a still further object of this invention to provide a viewing port which may be combined with a vacuum valve into a single easily installed structure having few parts.

It is still another object to provide a slidable, relatively friction free, vane or replacement closure exhibiting a positive sealing arrangement.

Other objects and many of the attendant advantages of this invention will be readily appreciated as the same becomes better understood by reference to the following detailed description when considered in connection with the accompanying drawings wherein:

FIG. 1 is a schematic diagram partly in section of one embodiment of the invention.

FIG. 2 is a sectional view of the components of the embodiment shown in FIG. 1.

FIG. 3 is a top view of the lower body portion and vane or replacement closure of th embodiment of FIG. 1.

FIG. 4 is a sectional view of the lower body portion and vane or replacement closure of the embodiment of FIG. 1 taken substantially along the line 4—4 of FIG. 3.

Referring to FIG. 1, valve body 11 is shown mounted on the surface 12 of chamber or other container wall 13 by bolts 14. Valve body 11 has a collar 16 extending outward of the chamber and including an upper threaded portion for receiving and attaching cap 15 which has a matching threaded portion. Cap 15 holds transparent viewing member 17 in sealed relationship with collar 16, as shown in FIG. 2, and tubular member 21 provides access to the space under transparent member 17 in order to permit duplicating conditions of pressure or vacuum within the valve body under circumstances later to be described. Arm or crank 22 operates a vane or replacement closure 24, shown more in detail in FIGS. 2–4, and through one-half a revolution will move the vane or replacement closure from a position across opening 20 to a position free of the opening.

In the sectional view of FIG. 2, the upper portion 23 and lower portion 26 of valve body 11 are shown with O-ring 30 in groove 29 providing a seal between upper body portion 23 and lower body portion 26. O-ring 31 provides a seal betwen transparent member 17 and collar 16, O-ring 32 provides a seal between upper portion 23 and replacement closure member 24, and gasket 34 is inserted between transparent member 17 and cap 15 to protect the transparent member from damage. Although vane or closure member 24 is shown to be entirely of metal composition, it is emphasized that a transparent center portion substantially the size of the opening in surface 12 may be substituted within the concept of this invention.

As more clearly shown in FIGS. 3 and 4 the vane or closure member 24 is disposed in a cut-out hollow portion 40 in the lower body member 26 which hollow portion exhibits an upper surface or face 44. Two pair of longitudinally spaced, laterally offset, parallel grooves or tracks 50 are disposed in surface 44 of the lower body member 26, and are provided at each end with curved or cam surfaces 52 connecting the bottom of the grooves or tracks with the surface 44. The vane or closure member 24 is provided with four spaced openings 54 in which the rollers 33 are rotatably mounted, the rollers being so located as to ride in the tracks 50 in the lower body member 26. A slot 56 is also provided in the vane 24 near the rearward end thereof to facilitate movement of the vane from an open to a closed position in a manner to be later described.

Crank 22 is attached to shaft 35 which in turn is mounted for rotation in housing 36 of upper body portion 23. Shaft 35 has a flange 37 at the end opposite crank 22, and the flange is provided with a tab 38 to which vane 24 is operatively connected by means of pin 39 riding in slot 56. Crank 22 is attached to shaft 35 by pin 41 in the embodiment shown, however, it is possible to attach the shaft and crank in a variety of ways within the concept of the invention. Tab 38, vane 24 and space 40 are selected in size to provide for complete removal of the vane from opening 20 when the vane is not in use. It is obvious that displacement of vane 24 may not be such as to completely remove it from opening 20, or may be such as to remove it beyond the periphery of the opening within the concept of this invention. It is also obvious that the components shown as metallic and rubber in the drawings may be of other material such as plastic and a rubber substitute within the concept of this invention.

In practice the apparatus is assembled on a structure such as a vacuum chamber or pressure chamber by first fitting together the upper and lower valve portions, including the vane, flange, shaft, crank and connecting members, positioning the foregoing over an appropriate opening in a wall of the chamber and securing the upper and lower portions to the surface by means of bolts or other mode of attachment Since crank 22, in the embodiment shown, extends beyond sides of the valve body it is important that a position be chosen which will permit free movement of the crank through the 180-degree arc shown in the drawings. It is submitted that a crank having a shorter arm or one which may be operated through a shorter arc may be substituted for the crank shown within the invention concept, the length of arm in the present embodiment obviously being inversely related to the amount of force necessary to actuate vane 24.

With the valve body in place and providing a desired seal for the chamber, to remove and clean or replace transparent member 17 it is first necessary, in order that conditions within the chamber not be affected, to actuate crank 22 so as to force vane 24 across opening 20 and into the space adapted to receive it. When the crank 22 is actuated to move from its open and closed positions (FIG. 1) it causes pin 39 to move in slot 56 thus moving vane 24 on its rollers 33 along grooves or tracks 50. As the rollers 33 ride up on curved or cam surfaces 52 and onto surface 44 vane 24 is forced against O-ring 32 thus sealing the chamber 13 from cavity 42 between the vane and transparent member 17. It is important to note that the advance edge 43 of vane 24 is tapered and is past O-ring 32 before roller 33 rides up on surface 44 thereby preventing the advance edge of vane 24 from being jammed against the O-ring and causing damage to the apparatus as well as an improper seal.

With vane 24 in position to seal off the chamber, cap 15 may be unscrewed and member 17 removed. Upon replacement of member 17, and with pressure against O-ring 31 to provide an adequate seal thereat, cavity 42 must be either evacuated or pumped to the pressure existing within the chamber before vane 24 may be withdrawn from across opening 20. When conditions within cavity 42 and the chamber are equal, vane 24 is withdrawn thereby accomplishing removal and reinsertion or replacement of transparent member 17 without affecting conditions within the chamber. Tubular member 21 must, of course, be plugged or otherwise sealed before vane 24 is withdrawn.

Obviously, many modifications and variations of the present invention are possible in the light of the above teachings. It is therefore to be understood that within the scope of the appended claim the invention may be practiced otherwise than as specifically described.

What is claimed is:

In combination, a valve and a removable transparent window for reviewing the inside of a vacuum or pressure chamber through a port in a side wall thereof wherein the window may be removed and replaced while maintaining the pressure conditions within said chamber, which comprises:

a valve body means secured to said chamber, said valve body means including upper and lower body portions with said lower body portion secured juxtaposed said chamber wall relative to said port therein, a passage through said upper and lower body portions in optical alignment with said port in said side wall of said chamber, a transparent window means, said transparent window means adapted to be removably mounted in said upper body portion to close an outer end of said passage in said upper body portion, a cut-out hollow portion within said lower portion in the surface adjacent said upper portion, said cut-out hollow portion extending normal to said passage through said upper and lower portions of said valve body, a seal means in the face of said upper portion juxtaposed said lower portion, said seal means surrounding said passage through said upper portion, passage closure means disposed within said cut-out hollow portion, said passage closure means mounted for movement normal to said passage through said upper and lower portion to close and to open said passage, means associated with said passage closure means and the surface of said lower portion juxtaposed said upper portion for forcing said closure means into a tight seal relative to the seal means in the face of said upper portion when said closure means is in a closed position relative to the passage through said upper and lower portions, means for moving said closure means into a closed or open position relative to said passage and said seal means whereby said transparent viewing means may be removed and replaced when said closure means is in the closed position without affecting prevailing conditions within said chamber, and means connected with the space confined by the passage within said upper portion for pressurizing or evacuating the space in said passage confined between said transparent window and said closure means when said closure means is in a closed position in order to remove and replace the window and subsequently opening the closure means to enable viewing of the chamber through said transparent window.

References Cited

UNITED STATES PATENTS

| | | | |
|---|---|---|---|
| 318,284 | 5/1885 | Ochwadt | 73—334 |
| 653,600 | 7/1900 | Wiley | 251—203 X |
| 853,168 | 5/1907 | Garbe | 251—203 X |
| 1,436,438 | 11/1922 | Cryer | 137—629 |
| 1,577,900 | 3/1926 | Evans | 137—559 X |
| 1,622,016 | 3/1927 | Wilson | 137—629 X |
| 2,543,107 | 2/1951 | Haatvedt | 220—82 X |
| 2,666,539 | 1/1954 | Avery | 250—41.95 X |
| 2,850,260 | 9/1958 | Perazone et al. | 251—203 X |

FOREIGN PATENTS

| | | |
|---|---|---|
| 1,079,552 | 5/1954 | France. |
| 205,533 | 10/1923 | Great Britain. |

WILLIAM F. O'DEA, *Primary Examiner.*

R. GERARD, *Assistant Examiner.*